3,265,627
ADDITION OF LITHIUM VALUES IN CONVERSION OF FISSION-PRODUCT WASTES TO A GLASS-LIKE SOLID FOR DISPOSAL
Walter E. Clark, Oak Ridge, and Curtis L. Fitzgerald and George D. Davis, Kingston, Tenn., assignors to the United States of America as represented by the Secretary of the United States Atomic Energy Commission
Filed Mar. 4, 1965, Ser. No. 437,330
4 Claims. (Cl. 252—301.1)

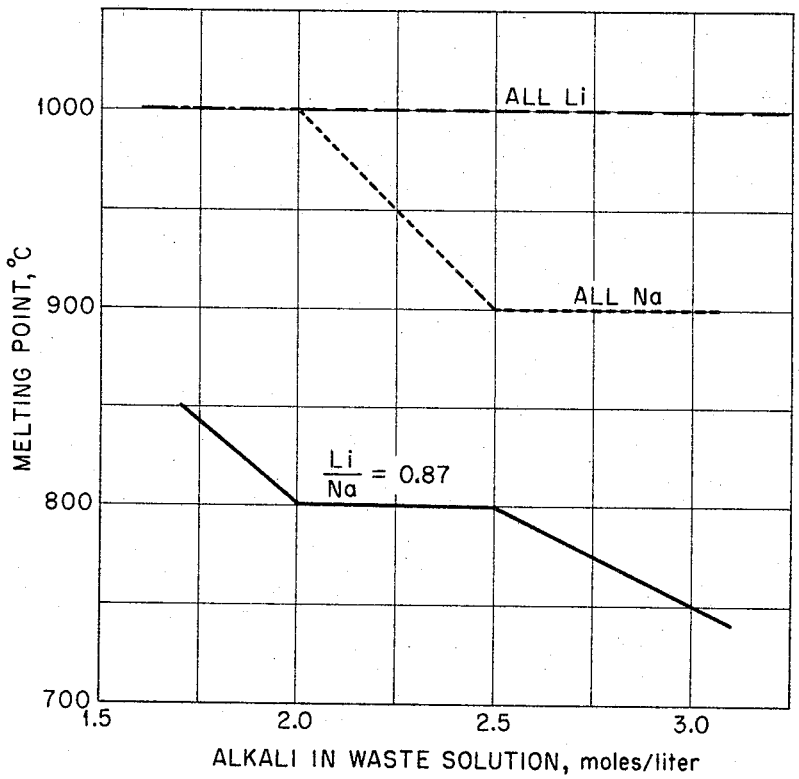

This invention relates to disposal of radioactive wastes and more particularly to the processing of sulfate-containing fission product solutions.

One of the problems presented by the increased use of nuclear energy is disposal of highly radioactive fission-product solutions resulting from chemical reprocessing of irradiated nuclear reactor fuel elements. Reprocessing is required to separate unburned fuel material and valuable transmutation products from fission products and inert components. In a typical reprocessing sequence uranium-containing fuel elements, after being stored for a period sufficient to allow decay of short-lived fission-product activity, are dissolved in nitric acid, and uranium and plutonium values are extracted with an organic solvent. The long-lived fission products along with corrosion products, inert components and process additives are retained in aqueous nitric acid solution.

The radiation level of the resulting nitric acid fission-product solutions is high, up to 5000 curies per gallon, and biologically hazardous isotopes such as strontium 90 are contained therein so that release of these solutions to any part of man's environment is precluded. The solutions produced to date have largely been stored underground in steel tanks, but the lifetime of tanks in contact with such corrosive solutions is limited and eventual failure may be expected. A more desirable approach is to evaporate the solutions and incorporate the resulting radioactive solids in a material suitable for long-term storage, for example, a non-leachable glass-like solid with high thermal conductivity and strength.

Various methods have been developed for conversion of fission product solutions to solid form for storage. These methods in general comprise fixation of fission-product activity in a glass or glass-like material by evaporating the solution, calcining the resulting solids to produce an oxide mixture, and heating the oxide mixture in combination with glass-forming additives to obtain a melt and solidifying the melt.

Corrosion of process equipment has been a major difficulty in these processes. The solutions are extremely corrosive, and acid-resistant materials of construction such as stainless steel have been required for all of the process steps. For certain types of fission-product solutions, namely those containing a substantial amount of sulfate, stainless steel corrosion rates are excessive under the conditions required for glass-formation. Metals more corrosion resistant than stainless steel are not practical from an economic standpoint, particularly for the disposal procedure wherein the same vessel, normally a cylindrical metal pot, is used both for preparation and long-term storage of the glass-like product.

Sulfate-containing fission-product solutions obtained by reprocessing methods employing sulfate-producing process additives constitute a major source of fission product wastes. Sulfate tends to be volatilized during calcination and formation of the melt at high temperatures, producing an atmosphere which corrodes stainless steel at a prohibitive rate. Sulfate volatilization has been reduced by providing sufficient sodium hydroxide in the solids mixture to render the mixture alkaline after nitrate is volatilized during calcination, but the use of sodium results in an undesirably high melting point in the glass-forming mixture and frequently causes unfavorable properties, that is, high solubility, poor mechanical integrity and low thermal conductivity, in the product.

It is desired to provide a means of retaining sulfate values during calcination and melting of the solids mixture without producing an unduly high melting point. A minimum melting point consistent with other required features is important in minimizing corrosion since most of the chemical mechanisms involved are temperature-dependent. The difference in corrosion rates at the temperature required for melt fluidity of the sodium-containing mixture, that is 900 to 1000° C., and a lower temperature such as 800° C. are such that stainless steel could be safely used for the latter, but not the former, temperature.

In addition to providing for retention of sulfate and a minimum melting point, the melt composition should be compatible with measures previously devised for control of volatilization of ruthenium and cesium values during calcination.

It is therefore an object of this invention to provide a method of converting sulfate-containing nitric acid fission-product solutions to solid form for disposal.

Another object is to provide a method of controlling sulfate volatilization in evaporation and calcination of said solutions consistent with a low melting point in the resulting solids.

Another object is to provide a method for converting said solutions to a glass-like, disposable solid in stainless steel equipment.

Another object is to provide a method of converting said solutions to a glass-like solid having low aqueous solubility, high strength and high thermal conductivity.

Other objects and advantages will be apparent from the following detailed description and claims.

In accordance with our invention sulfate-containing nitric acid fission-product solutions obtained by reprocessing of irradiated nuclear reactor fuel are converted to solid form for disposal by evaporating the solution, calcining the resulting solid mixture, heating to the melting point and cooling to obtain glass-like material, the composition of the solution being adjusted to contain sufficient alkali metal values to maintain the oxide mixture in an alkaline state during calcination, the alkali metal values being lithium and sodium at a lithium-to-sodium molar ratio of 0.75:1 to 1.5:1. The use of a lithium-sodium mixture instead of sodium alone as the alkali metal component in this process lowers the melting point sufficiently to allow the use of stainless steel equipment without excessive corrosion. In addition, favorable properties, that is, low aqueous solubility, high strength and high thermal conductivity, are consistently obtained in the product by this means, in contrast to the unfavorable properties frequently resulting from the use of sodium alone.

We have found that the use of a lithium-sodium mixture serves both to decrease the melting point of the oxide mixture and to improve other required properties such as product insolubility and glass-forming capability. Other alkali metal combinations fail to meet one or more of these requirements. Potassium, for example, is undesirable because its presence imparts high aqueous solubility in the product.

The composition of the starting fission product solution is not critical to the method of our invention, and the sodium-lithium mixture may be used in the further processing any of the fission-product solutions produced by current reprocessing methods. The present method, however, is primarily applicable to the processing of sulfate-containing solutions obtained by reprocessing methods employing a sulfate additive. The molar compositions of two such solutions which have been or are being produced in large quantities are as follows:

| Solution Constituent | "Purex IWW" waste solution | "FTW-65" (Formaldehyde-treated waste solution to be produced in 1965) |
|---|---|---|
| $H^+$ | 5.6 | 0.5 |
| $Na^+$ | .6 | .3 |
| $Al^{+3}$ | .1 | .05 |
| $Fe^{+3}$ | .5 | .1 |
| $Cr^{+3}$ | .01 | .02 |
| $Ni^{+2}$ | .01 | .01 |
| $Hg^{+2}$ | | .004 |
| $SO_4^{-2}$ | 1.0 | .15 |
| $PO_4$ | | .005 |
| $SiO_2$ | | .01 |
| $NO_3^-$ | 6.1 | 1.0 |

The fission-product content of these solutions varies with the irradiation history of the fuel material. For example, typical solutions obtained from fuel irradiated to a level of 10,000 megawatt days per ton contain sufficient fission products to provide a fission-product oxide content of 10 mole percent of the oxide mixture, exclusive of additives, obtained upon calcination and solutions obtained from fuel material irradiated to a level of 35,000 megawatt days per ton provide 58 mole percent fission-product oxides in the calcined oxide mixture.

The most critical feature of the present invention is the provision of the lithium-sodium mixture in the calcined oxide intermediate prior to heating to the melting point. The composition of the calcined oxide mixture is preferably controlled by adjusting the composition of the starting solution.

In processing sulfate containing waste solutions of the type described above sufficient alkali metal values are provided to maintain the melt in an alkaline condition after nitrate is lost by decomposition. An alkali metal content equivalent to 25 to 60 mole percent alkali metal oxide in the resulting melt is preferred. As pointed out above, the alkali metal component in the present process comprises lithium and sodium values at a Li/Na mole ratio 0.75:1 to 1.5:1. Molar ratios outside this range do not produce a significant advantage over sodium alone as the alkali metal component.

In order to provide glass-like properties in the product other previously known additives are employed. A preferred range of compositions, in combination with 25 to 60 mole percent alkali metal oxide, for sulfate-containing waste solutions is as follows: Aluminum oxide, 2 to 35 mole percent; phosphate+sulfate+borate, 15 to 60 mole percent. A relatively large proportion of phosphate in this component is preferred to obtain a low melting, glass-forming mixture. Phosphate is also advantageous in that it may be added to the solution in the form of phosphite or hypophosphite to minimize ruthenium volatilization during evaporation and calcination. The alkali metal and phosphate values form alkali metal phosphate compounds upon being heated to elevated temperatures.

Expressed differently, the preferred glass-forming mixtures comprise an anionic material, that is an acidic phosphate or borate, a cationic or alkali metal component and an amphoteric material such as oxides of aluminum or iron. In addition to these constituents, the product glass contains fission-product oxides at a level up to about 21 mole percent, depending on the composition of the starting solution. These oxides do not significantly affect melt properties, except that they tend to increase the melting point.

The method of evaporating the solution and melting the resulting solids is not critical to the present invention. In a preferred embodiment the solution, after adjustment of composition, is evaporated to dryness by heating in a stainless steel pot. The resulting solids are then calcined and heated to the melting point, normally about 100° C. above the initial softening temperature. Holding at the melting temperature for a period of at least 4 hours is required to consolidate the product into a dense, homogeneous material. All of these steps may be performed simultaneously in a single vessel by continuously introducing the solution at the top to maintain successive layers of solution, calcined solid and melt until the melt builds up to the desired level.

Although our invention is most advantageous for processing of sulfate-containing solutions, the lithium sodium mixture may be employed for any other fission product solution wherein a substantial amount of alkali metal is incorporated in the glass forming mixture.

Our invention is further illustrated by the following examples:

Example I

A simulated waste solution was prepared to correspond to the composition given above for "FTW-65" solutions. The solution was concentrated by a factor of three by evaporation. The following materials were then added to the solution to ensure formation of a glass-like solid.

| Additive: | Amount added (moles per liter) |
|---|---|
| Phosphate or phosphite (as acid or sodium salt) | 1.0 to 3.0 |
| Aluminum (as nitrate) | 0.5 to 0.6 |
| Alkali metal (as hydroxide or salt) | 1.7 to 3 |

Experiments were then conducted wherein a 0.25 liter portion of the solution was evaporated to dryness, the resulting solids were calcined and heated to the melting point. The melting point was determined as the temperature at which the melt became fluid enough to pour, normally about 100° C. above the initial softening temperature. In one series of experiments the alkali metal additive was sodium alone, in concentrations from 1.7 to 3.0 moles per liter. In a second series lithium alone was used, and in a third a sodium-lithium mixture have a mole ratio Li/Na=0.87. The results obtained may be seen by reference to the accompanying drawing. The sodium-lithium mixture resulted in a melting point at least 100° C. lower than for sodium alone. The melting temperatures for the lithium-sodium mixture (750 to 850° C.) are such as to allow the use of stainless steel equipment without excessive corrosion, while the temperatures required for the melt containing sodium alone (over 900° C.) results in a prohibitive stainless steel corrosion rate.

Example II

A simulated "FTW-65" solution of the composition of Example I was converted to solid form by the following procedure. The solution was concentrated by evaporation by a factor of three. The following materials were then added:

| Additive | Amount (moles per liter) |
|---|---|
| Phosphate as $H_3PO_4$, $H_3PO_3$ or sodium salt | 1.175 |
| Calcium as $Ca(NO_3)_2$ | 0.144 |
| Aluminum as $Al(NO_3)_3 \cdot 9H_2O$ | 0.153 |
| Borate as $Na_2B_4O_7 \cdot 10H_2O$ | 0.25 |
| Total alkali metal (added as hydroxide) | 1.75 |

(The total alkali metal includes sodium already in solution or added as phosphate or borate salt.)

The solution was then evaporated to dryness and the resulting solids were calcined and heated to the melting point. The calculated compositions of the melts in mole percent were as follows: $Al_2O_3$, 3.1; CaO, 4.4; alkali metal oxide, 40.4; $Fe_2O_3$, 4.6; $Cr_2O_3$, 1.0; NiO, 1.0; $SO_3$, 13.7; $P_2O_5$, 15.8; $B_2O_3$, 15.2 and $EiO_2$, 1.0. The melt was cooled in each case and the resulting solid examined. In one case the alkali metal was sodium alone. The softening temperature for the resulting melt was 750° C. and the melting point 825° C. The product was a segregated, rocky material having a relatively high solubility in water, all of which properties are unsatisfactory for long-term storage of fission product activity.

In another case the alkali metal was a lithium-sodium mixture at a Li/Na mole ratio of 0.9. The softening temperature in this case was 700° C. and the melting point 750° C. The resulting solid was a dense, homogeneous, glass-like material insoluble in water, these properties being favorable for long-term storage.

*Example III*

A simulated waste solution having the same composition as the starting solution in Example I was converted to glassy solid with and without added lithium values. The solution was first concentrated by a factor of three by evaporation. The following materials were then added:

| Additive: | Amount (moles per liter) |
|---|---|
| $H_3PO_4$ or $H_3PO_3$ | 1.0 |
| $Ca(NO_3)_2$ | 0.2 |
| $Al(NO_3)_3 \cdot 9H_2O$ | 0.5 |
| Alkali metal hydroxide | 1.14 |

The solution was then calcined and the resulting oxide mixture was heated to the melting point. The calculated compositions of the melts in mole percent were as follows: $Al_2O_3$, 11.8; CaO, 7.2; alkali metal oxide, 37.0; $Fe_2O_3$, 5.4; $Cr_2O_3$, 1.1; NiO, 1.1; $Ru_2O$, 0.2; $SO_3$, 16.3; $P_2O_5$, 18.4 and $SiO_2$, 1.1. In one case the alkali metal was sodium alone, the softening temperature being 800° C. and the melting point 950° C. During 100 minutes holding at 900° C. the melt lost 10.7 percent of its sulfate content by volatilization, and this result would severely corrode stainless steel.

In another case the alkali metal was a lithium-sodium mixture having a Li/Na molar proportion of 1.26. The softening temperature for this melt was 700° C. and the melting point 800° C. In order to test its sulfate-retention properties this melt was also heated to 900° C. and held for 100 minutes. Only 4.1 percent of the total sulfate was volatilized. In a practical-scale experiment using the same melt composition, only 0.7 percent of the sulfate was volatilized. The product in both cases was insoluble, glassy material suitable for storage.

The above examples are merely illustrative and are not to be understood as limiting the scope of our invention, which is limited only as indicated by the appended claims.

Having thus described our invention, we claim:

1. In the process for conversion of a nitric-acid fission-product-containing solution obtained by chemical reprocessing of irradiated nuclear reactor fuel to a glass-like solid for disposal which comprises evaporating said solution, calcining the resulting solids, heating said solids to the melting point and solidifying the resulting melt, the composition of said solution being adjusted to provide a glass-forming mixture upon calcination, and said solution containing a substantial amount of alkali metal values, the improvement wherein said alkali metal values are lithium values and sodium values at a lithium-to-sodium molar ratio of 0.75:1 to 1.5:1.

2. The process for converting a sulfate-containing nitric-acid-fission-product solution to solid form for disposal which comprises evaporating said solution, calcining the resulting solids, heating said solids to the melting point and solidifying the resulting melt, the composition of said solution being adjusted to contain sufficient alkali metal values to maintain the resulting solids in an alkaline condition during calcination, said alkali metal values being lithium values and sodium values at a lithium-to-sodium molar ratio of 0.75:1 to 1.5:1.

3. The process for converting a sulfate-containing nitric acid fission product solution to solid form for disposal which comprises evaporating said solution, calcining the resulting solids, heating said solids to the melting point and solidifying the resulting melt, the composition of said solution being adjusted to provide a glass-forming mixture upon calcination and sufficient alkali metal values being provided in said solution to maintain said solids in an alkaline condition during calcination, said alkali metal values being lithium values and sodium values at a lithium-to-sodium molar ratio of 0.75:1 to 1.5:1.

4. The process for converting a sulfate-containing nitric-acid fission-product solution to solid form for disposal which comprises evaporating said solution, calcining the resulting solids, heating said solids to the melting point and solidifying the resulting melt, the composition of said solution being adjusted to provide a composition in the resulting solidified product of 25 to 60 mole percent alkali metal oxide, 2 to 35 mole percent aluminum oxide, 15 to 60 mole percent anionic materials in the group consisting of sulfate values, phosphate values and borate values, the major proportion of said anionic materials being phosphate values, and up to 21 mole percent fission-product oxides, said alkali-metal being a lithium-sodium mixture having a lithium-to-sodium molar ratio of 0.75:1 to 1.5:1.

References Cited by the Examiner

Johnson et al., Third International Conference on the Peaceful Uses of Atomic Energy, vol. 14, pages 244–252. 1964.

BENJAMIN R. PADGETT, *Acting Primary Examiner.*

L. A. SEBASTIAN, *Assistant Examiner.*